United States Patent
Jain et al.

(10) Patent No.: US 9,176,829 B2
(45) Date of Patent: Nov. 3, 2015

(54) MANAGING RECOVERY VIRTUAL MACHINES IN CLUSTERED ENVIRONMENT

(75) Inventors: Manoj Kumar Jain, Hyderabad (IN); Krishan Kumar Attre, Hyderabad (IN); Prasad Thiruveedu, Hyderabad (IN); Praveen Vijayaraghavan, Hyderabad (IN); Vrijesh Kothari, Hyderabad (IN); Ahmed Bisht, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 256 days.

(21) Appl. No.: 13/174,870

(22) Filed: Jul. 1, 2011

(65) Prior Publication Data

US 2013/0007506 A1 Jan. 3, 2013

(51) Int. Cl.
*G06F 11/00* (2006.01)
*G06F 11/14* (2006.01)
*G06F 11/20* (2006.01)

(52) U.S. Cl.
CPC ............ *G06F 11/1484* (2013.01); *G06F 11/20* (2013.01)

(58) Field of Classification Search
USPC ........................................................ 714/4.12
See application file for complete search history.

(56) References Cited

U.S. PATENT DOCUMENTS

| | | | |
|---|---|---|---|
| 6,944,785 B2 * | 9/2005 | Gadir et al. ................... | 714/4.11 |
| 7,143,307 B1 * | 11/2006 | Witte et al. .................... | 714/6.23 |
| 7,213,246 B1 * | 5/2007 | van Rietschote et al. ......... | 718/1 |
| 7,593,968 B2 * | 9/2009 | Beck .................................. | 1/1 |
| 7,613,749 B2 | 11/2009 | Flynn, Jr. et al. | |
| 7,716,377 B2 | 5/2010 | Harris et al. | |
| 7,752,486 B2 * | 7/2010 | Satran et al. .................... | 714/4.1 |
| 7,809,976 B2 * | 10/2010 | Goodson et al. ................... | 714/3 |
| 8,234,515 B2 * | 7/2012 | Collier et al. ..................... | 714/1 |
| 8,255,735 B2 * | 8/2012 | Goodson et al. ................... | 714/3 |
| 2003/0191810 A1 * | 10/2003 | Muhlestein et al. ........... | 709/215 |
| 2005/0273645 A1 * | 12/2005 | Satran et al. ...................... | 714/4 |
| 2005/0278410 A1 * | 12/2005 | Espino ............................ | 709/201 |
| 2006/0274761 A1 * | 12/2006 | Error et al. ...................... | 370/396 |
| 2007/0088762 A1 * | 4/2007 | Harris et al. ................... | 707/201 |
| 2007/0174661 A1 * | 7/2007 | Peddada ........................... | 714/4 |
| 2007/0244937 A1 * | 10/2007 | Flynn et al. .................... | 707/204 |
| 2007/0250738 A1 * | 10/2007 | Phan ................................. | 714/6 |
| 2008/0189468 A1 * | 8/2008 | Schmidt et al. .................... | 711/6 |
| 2008/0270825 A1 * | 10/2008 | Goodson et al. ................... | 714/6 |

(Continued)

OTHER PUBLICATIONS

Machida, et al., "Redundant Virtual Machine Placement for Fault-tolerant Consolidated Server Clusters", Retrieved at <<http://ieeexplore.ieee.org/xpl/freeabs_all.jsp?arnumber=5488431>>, Apr. 19-23, 2010, pp. 32-39.

"Backup & Recovery", Retrieved at <<http://www.vmware.com/technical-resources/high-availability/virtualization-backup.html>>, Retrieved Date: Mar. 22, 2011, pp. 4.

*Primary Examiner* — Kamini Patel
(74) *Attorney, Agent, or Firm* — Sunah Lee; Kate Drakos; Micky Minhas

(57) ABSTRACT

Techniques involving replication of virtual machines of virtual machines in a clustered environment are described. One representative technique includes receiving a replication request to replicate a primary virtual machine. A clustering broker is configured to act on the replication request on behalf of a cluster of recovery nodes, by at least placing a replicated virtual machine corresponding to the source virtual machine on a recovery node and facilitate tracking the migration of the replicated virtual machine within the cluster. The clustering broker returns an address of the recovery node that has been placed or found through tracking for the particular virtual machine.

20 Claims, 12 Drawing Sheets

(56) References Cited

U.S. PATENT DOCUMENTS

| | | |
|---|---|---|
| 2009/0113233 A1* | 4/2009 | Phan ................................ 714/4 |
| 2009/0198949 A1* | 8/2009 | Kuligowski et al. .......... 711/203 |
| 2010/0211829 A1* | 8/2010 | Ziskind et al. ................. 714/48 |
| 2010/0251006 A1* | 9/2010 | Goodson et al. ................. 714/3 |
| 2010/0299666 A1* | 11/2010 | Agbaria et al. .................. 718/1 |
| 2011/0246813 A1* | 10/2011 | Collier et al. .................... 714/3 |
| 2013/0232492 A1* | 9/2013 | Wang ............................... 718/1 |

* cited by examiner

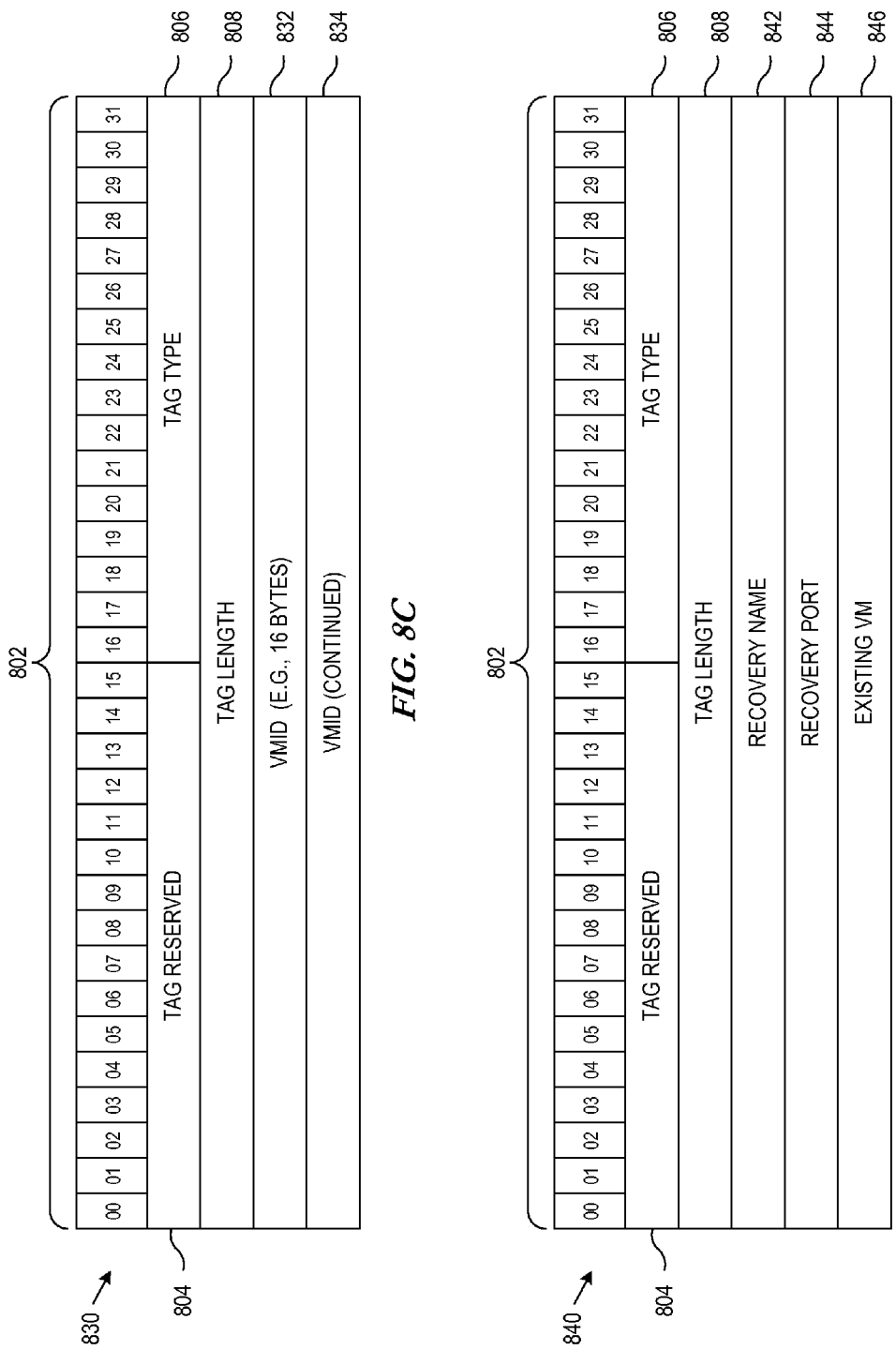

MANAGING RECOVERY VIRTUAL MACHINES IN CLUSTERED ENVIRONMENT

BACKGROUND

With the heavy reliance on computing needs by businesses and individuals, the need for uninterrupted computing service has become increasingly vital. Many organizations develop business continuity plans to ensure that critical business functions will enjoy continuous operation and remain available in the face of machine malfunctions, power outages, natural disasters, and other disruptions that can sever normal business continuity.

Local disruptions may be caused, for example, by hardware or other failures in local servers, software or firmware issues that result in system stoppage and/or re-boot, etc. Local solutions may include server clustering and virtualization techniques to facilitate failover. Local failover techniques using virtualization provide the ability to continue operating on a different machine or virtual machine if the original machine or virtual machine fails. Software can recognize that an operating system and/or application is no longer working, and another instance of the operating system and application(s) can be initiated in another machine or virtual machine to pick up where the previous one left off. For example, a hypervisor may be configured to determine that an operating system is no longer running, or application management software may determine that an application is no longer working which may in turn notify a hypervisor or operating system that an application is no longer running. High availability solutions may configure failover to occur, for example, from one machine to another at a common site, or as described below from one site to another. Other failover configurations are also possible for other purposes such as testing, where failover may even be enabled from one virtual machine to another virtual machine within the same machine.

Disaster recovery relates to maintaining business continuity even in the event of large scale disruptions. For example, certain failure scenarios impact more than an operating system, virtual machine, or physical machine. Malfunctions at a higher level can cause power failures or other problems that affect multiple machines, or an entire site such as a business's information technology (IT) or other computing center. Natural and other disasters can impact an enterprise that may cause some, and often all, of a site's computing systems to go down. To provide disaster recovery, enterprises may replicate information from one or more computing systems at a first or "primary" site to one or more computing systems at a remote, secondary or "recovery" site. Replicating information may involve continuous, or at least repeated, updates of information from the primary to the recovery site.

To provide high availability, either or both of the primary and recovery sites may utilize failover clustering as described above, where a virtual machine or other information may remain available even when its host server fails. The use of both disaster recovery techniques between sites, in combination with clustering techniques between servers at either/each site, creates some complexities. For example, the use of failover clustering techniques at the recovery site may involve running another instance of a first recovery server's virtual machine in at least one other recovery server, such as when the first recovery server fails or otherwise becomes unavailable. When this first recovery server, and possibly some or all of the other recovery servers, are offline due to planned or unplanned events, the source or "primary" server would be unable to send any further replicas (e.g., replicated virtual machine base information and/or updates thereto) to the offline recovery server(s). The virtual machine replication would be suspended, but the virtual machine at the primary site would continue its workload, which would result in changes to the virtual machine. These changes to the virtual disk will continue to accumulate at the primary site, as the recovery server has become unavailable to receive the otherwise more frequent replicas. When the offline recovery node becomes available again, there would be spikes in the resource utilization as the amount of data to be sent could be very large. In cases of prolonged downtime of the recovery server, a complete replication may need to be started from scratch resulting in loss of data and exposing the business to an extended unprotected period. This could further impact operations as the initial replication may be significantly larger than "delta" replicas, and the virtual machine may require additional configurations in view of the initial replication. Further, if disaster strikes at the primary site during the time the recovery server is down, business continuity would be lost. A significant amount of data would likely be lost as well, as the data on the recovery server would be substantially behind the primary server due to the interruption of the replication process.

SUMMARY

Techniques involving replication of virtual machines in a clustered environment are described. One representative technique includes receiving a replication request(s) to replicate at least a portion of a source or "primary" virtual machine. A clustering broker is configured to act on the replication request on behalf of a cluster of recovery nodes, by at least facilitating placement of a replicated virtual machine corresponding to the source virtual machine on a recovery node, and enabling the migration of the replicated virtual machine to be tracked within the cluster. The clustering broker returns the network address of the recovery node that has been placed or found through tracking for the particular virtual machine.

In another particular implementation of such a technique, a computer-implemented method for facilitating replication of virtual machines is provided. For example, such a method may facilitate replication of virtual machines in the case of migration of virtual machines at a recovery site. In one embodiment, the computer-implemented method involves receiving a first update request at a targeted recovery node to provide an update to a replicated virtual machine that is hosted by the targeted recovery node. In the event of the replicated virtual machine having migrated from the target recovery node, a second update request is received at a clustering broker that acts on behalf of a cluster of recovery nodes, including the target recovery node. The clustering broker identifies the current recovery node in the cluster to which the replicated virtual machine has migrated, and the address of that current recovery node is returned to the primary server that made the update requests.

Another representative implementation involves another computer-implemented method for facilitating replication of virtual machines. The computer-implemented method includes receiving a request from a source server to establish a relationship to replicate a virtual machine on any recovery server that is part of a cluster of recovery servers. The request is accepted by a clustering broker on behalf of the cluster of recovery servers, which selects one of the recovery servers to host the replicated virtual machine. The clustering broker places the replicated virtual machine on the cluster to configure the replicated virtual machine as highly available. A network address of the selected recovery server that is hosting the replicated virtual machine is sent to the source server.

In one particular embodiment associated with any of the devices and/or techniques described herein, centralized management may be provided on a cluster of recovery nodes. For example, a user interface may be provided to facilitate establishing, changing or otherwise manipulating configuration settings and propagating such configuration settings to any or all of the nodes of the cluster. In one embodiment, the centralized management may be automated, and may enable, for example, the creation of high-availability virtual machines.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 8A-8D illustrate representative communication protocols between the primary site and the recovery cluster;

DETAILED DESCRIPTION

Figure 1:
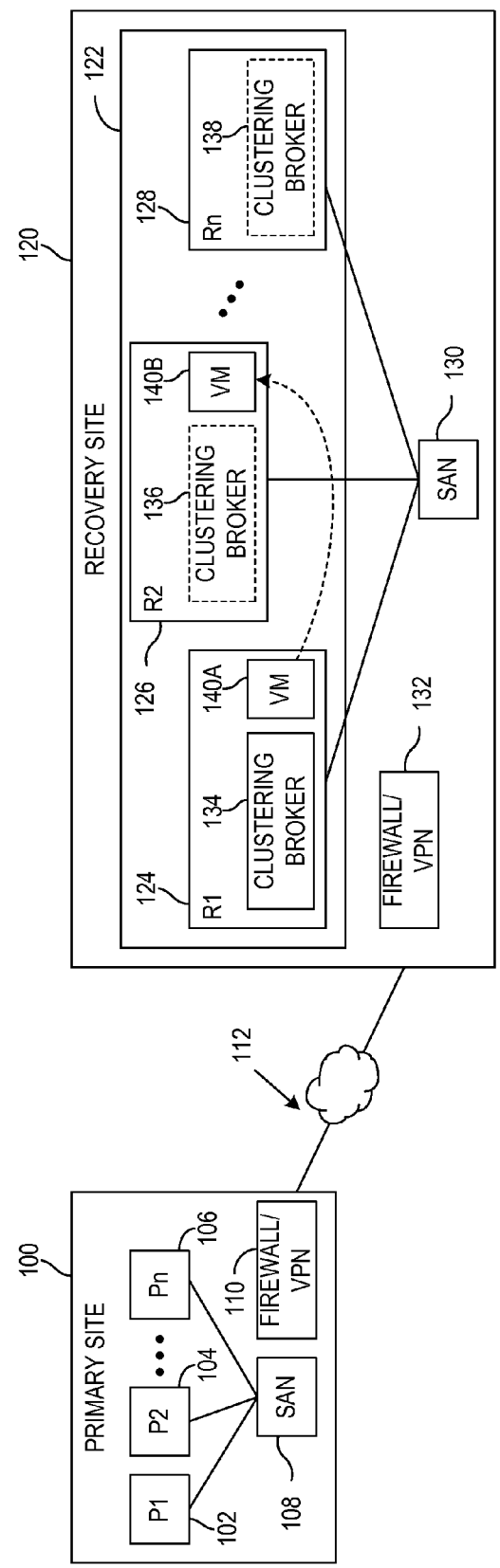
FIG. 1 is a block diagram depicting a representative replication environment involving a primary computing site and a remote, second or "recovery" computing site.

In the following description, reference is made to the accompanying drawings that depict representative implementation examples. It is to be understood that other embodiments and implementations may be utilized, as structural and/or operational changes may be made without departing from the scope of the disclosure.

The disclosure is generally directed to data replication. While the principles described herein are applicable to any replication of data from one data storage device or facility to another data device or facility, numerous embodiments in this disclosure are described in the context of disaster recovery where replicated data and processing resources are provided off-site from the primary computing center. It should be recognized, however, that the principles described herein are applicable regardless of the distance or manner in which replicated data is transferred to the recovery site(s).

A virtual machine (VM) running may be running on a first computing device referred to herein as a primary server, at a first site referred to herein as a primary site. The VM can be replicated to at least one second device (recovery server) at a second site (recovery site). An initial replication (IR) is initially performed where the VM is sent either over the network (online IR) or off the network (out-of-band, or OOB IR). When the IR is complete, changes or "deltas" to the virtual machine are recorded on differencing disks or by other similar means and sent to the recovery site. These updates to the VM's virtual disk may be sent at fixed, changing, or random intervals, but in any event are recurring in one embodiment.

As noted above, the recovery site may employ failover clustering techniques, where computing devices in the cluster can continue running VMs when their respective host devices fail. Where disaster recovery techniques are also used, updates from a primary server to a recovery server might not reach their targeted recovery server if and when that recovery server is down for any reason. This creates complexities, and can adversely impact recovery point objectives (RPO).

For example, when a recovery server goes offline, the primary server would be unable to send any further replicas to the offline recovery server. The virtual machine replication would be suspended, but the virtual machine at the primary site would continue its workload and consequent updates to the virtual storage. These updates will accumulate on the primary server, as the offline recovery server cannot accept the incoming replicas. When the offline recovery node again becomes available, there would be spikes in the resource utilization as the amount of data to be sent could be very large. In cases of prolonged downtime of the recovery server, another IR may be required. Business continuity can be lost where disaster strikes at the primary site during the time the recovery server is down. A significant amount of data would likely be lost as well, as the data on the recovery server would lag that of the primary server as a result of the inability for the primary server to regularly send the virtual disk updates.

As noted above, whenever one of the nodes on the recovery side experiences downtime for maintenance, unplanned events, etc., the VM can be made available in another node, and the VM replication from primary to recovery can continue. However, various circumstances occurring at the clustered recovery site can raise issues and result in complexities. For example, when a VM moves or "migrates" from one recovery server to another recovery server in a clustered environment, the primary server will be unaware of the move. The primary server would continue to send replication data to the recovery server that was previously set up as the destination (if it is still available), which would reply with a message indicating that the VM is not available. The replication would stop until an administrator intervenes to fix it.

Another issue relates to high availability for the recovery VM and load balancing. Virtual machines that are created on the recovery side may be made to be highly available, so that the administrator can move them around easily for maintenance of the nodes, to achieve load balancing, or other reasons. For example, there is a process to make a particular functionality, whether that be a SQL server, file server, VM, etc. to be made a cluster resource. Typically this is a manual step, and is increasingly tedious as the number of virtual machines at the recovery site increases. Further, the virtual machines will have an initial node where they are placed —if they were all initially placed on one node, the load on that node would be higher than on the rest.

Recovery server configuration synchronization can also be an issue. A recovery server may need to be configured to accept replication. To ensure that the nodes are symmetric in terms of the replication, the configuration steps would need to be repeated on each cluster node. Further, after the initial configuration, configuration changes might occur and these need to be kept in sync, which can be tedious and error-prone.

Another representative problem relates to the initial replication (IR) in the recovery site cluster. The size of the IR data (for virtual machines) may be on the order of many gigabytes, and online IR may not be economical from both a cost and resource perspective. As a result, the primary administrator may perform an out-of-band (OOB) IR on the initial replica. Upon receiving the initial replication payload, the recovery side administrator would have to manually find the recovery node to which the initial copy was made, and perform tasks to complete the initial replication on that node. This can be arduous, especially where the number of virtual machines has grown into the hundreds across large clusters.

These issues increase the cost of operations, and are not uncommon VM migrations are commonly used for optimizing resource consumption and for maintenance. This is true even for recovery virtual machines that are not running. The significance of these problems continues to increase as clustering deployments are increasing in size, both in terms of the number of nodes and the number of virtual machines. Without a good solution to these problems, users may have to cut back on the flexibility of deployment topology and/or bear additional costs of operations.

To address these and other problems, the present disclosure provides solutions enabling lower total cost of ownership (TCO). Among other things, techniques described in the disclosure enable placement of virtual machines across storage types, creating recovery high-availability virtual machines without administrator intervention, establishing replication after a recovery virtual machine migrates, and unified and centralized management with failover clustering.

Various embodiments below are described in terms of virtual machines. Virtualization generally refers to an abstraction from physical resources, which can be utilized in client and server scenarios. Hardware emulation involves the use of software that represents hardware the operating system would typically interact with. Hardware emulation software can support guest operating systems, and virtualization software such as a hypervisor can establish a virtual machine (VM) on which a guest operating system operates. Much of the description herein is described in the context of virtual machines, but various principles described herein are not limited thereto.

FIG. 1 is a block diagram depicting a representative replication environment involving a primary computing site 100 and a second or recovery computing site 120. The primary site 100 represents a computing environment, such as at a company's main office. The recovery site 120 represents a second site that includes computing resources to replicate information from the primary site 100, and to take over the computing responsibilities in the event of disaster or other failure impacting one or more of the computing devices at the primary site 100. While the recovery site 120 may be located in close proximity to the primary site 100, in one embodiment the recovery site 120 is a remote site to facilitate disaster recovery efforts impacting the primary site 100.

The representative primary site 100 may include one or more primary computing devices or servers, depicted as primary devices P1 102, P2 104 through Pn 106. These devices may host various types of servers, such as structured query language (SQL) or other database servers, e-mail servers, customer relationship management (CRM) servers, Internet information services (IIS) servers, etc. The devices P1 102, P2 104, Pn 106 may be coupled via a storage area network (SAN) 108 to enable storage devices to be accessible to the servers. It should be noted that use of a SAN 108 is optional, and the principles described herein are equally applicable in connection with any storage. Firewall/virtual private network (VPN) 110 or analogous security connection mechanisms may be used to secure the connection(s) between the primary site 100 and recovery site 120.

At the recovery site 120, the example of FIG. 1 assumes a cluster 122 of recovery computing devices, depicted as recovery devices R1 124, R2 126 through Rn 128. The multiple devices of the cluster 122 may provide failover clustering to provide high availability at the recovery site 120. The recovery devices R1 124, R2 126, Rn 128 provide the computing resources where replicated information from the first site 100 may be received and stored, and where recovery computing operations can be initiated in the event of disaster or other event rendering the first site 100 unable to continue its computing responsibilities.

The first site 100 and second site 120 communicate by way of communication links 112, which can involve any type of electronic communication interface such as direct cabling, wireline networks, wireless networks and the like, and any combination thereof. As noted above, embodiments where disaster recovery is an objective, the communication links 112 will generally involves expanded networks such as a wide area network (WAN), global area network (GAN) or other network enabling the remote site 120 to be sufficiently separated from the primary site 100 to avoid being subjected to the same disaster event. Some or all of the recovery devices R1 124, R2 126, Rn 128 of the cluster 122 may be coupled, for example, via a SAN 130 or other shared storage technology to enable storage devices to be accessible to the recovery servers. Firewall/VPN 132 or analogous security connection mechanisms may be used to secure the connection(s) between the primary site 110 and recovery site 120.

To address at least the problems described above, a brokering technique is disclosed that provides an intermediary of administrative services for brokering the management of virtual machines between the site requesting replication and the site where replication is conducted. In one embodiment, this resource may be provided at any of a plurality of nodes in the cluster 122, as depicted by clustering brokers 134, 136, 138, which may provide a high availability clustering broker solution. In one embodiment, a single instance of this clustering broker resource (e.g., clustering broker 134) will be running at a recovery cluster but is available to all nodes 124, 126, 128. As a more particular example, the clustering broker 134 may reside on a particular node 124, but may be available to all of the notes 124, 126, 128, and may be a highly-available resource in that if node 124 was to fail or otherwise go down, the clustering broker may be instantiated in another node (e.g., clustering broker 136 of node 126). Thus, while FIG. 1 depicts a clustering broker 134, 136, 138 at each of the nodes in the cluster 122, it should be recognized that in one embodiment a single clustering broker is provided at any of the nodes 124, 126, 128 to provide the clustering broker functionality described herein. Among other things, the functionality of the clustering broker 134, 136, 138 facilitates placement of virtual machines across storage types, creation of high-availability virtual machines without administrator intervention, management of replication after a recovery virtual machine migrates, and centralized management.

For example, assume that primary device or "node" 102 attempts to send a replication update, such as a differencing disk, snapshot or other copy, to the recovery device or "node" 124. Where a virtual machine VM 140A migrates from node 124 to node 126 as depicted by migrated VM 140B, the clustering broker 134 can serve as an intermediary between the primary server requesting the replication update (P1 102) and the cluster 122. The clustering broker 134 can, for example, notify the requesting primary node P1 102 on behalf of the targeted recovery device R1 124 that the VM 140A has migrated to node 126. Further, the clustering broker 134, 136, 138 can locate a targeted recovery node when an initial replication payload is received at the cluster 122, which relieves the manual administrative process of manually finding the recovery node to which the initial replication was made and perform the task of completing the initial replication on that node. The clustering broker 134, 136, 138 can also facilitate moving virtual machines from node to node for maintenance, to achieve load balancing, etc. The clustering broker 134, 136, 138 can also enable configuration functions to be performed once while propagating the settings to the other nodes, to alleviate configuring each node separately. Configuration settings can also be kept in sync through a single access point when the configuration changes.

Figure 2:
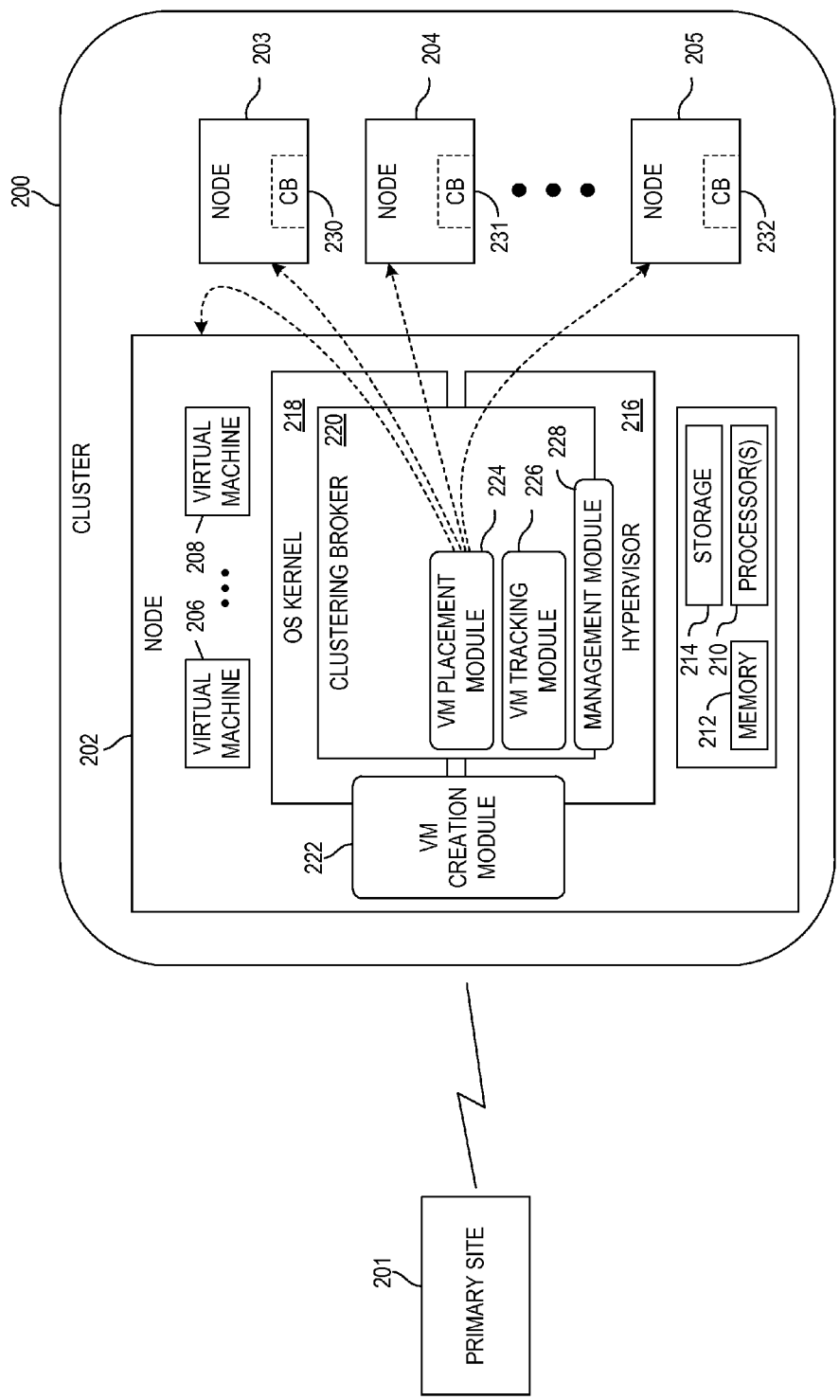
FIG. 2 is a block diagram of a representative cluster of recovery nodes that may be provided at a recovery site.

FIG. 2 is a block diagram of another representative cluster 200 of recovery nodes 202-205 that may be provided at a recovery site. Each node may host one or more virtual machines 206, 208 that are replicas of servers or virtual machines at the primary site 201. In this example, each node 202-205 may include computing capabilities such as one or more physical or logical processors 210, memory 212, storage 214, etc. As used herein reference to a processor may refer to one or more physical processors, one or more logical processors, stand-alone or distributed processors, and the like, or any combination thereof. One or more of the nodes may include a hypervisor 216 or other virtual machine management module that presents a virtual operating platform on which operating systems 218 and virtual machines 206-208 may operate. Features of the hypervisor 216 and/or operating system 218 may be used, adapted or added to provide functionality such as the clustering broker 220 functionality described herein.

In accordance with the present disclosure, the functionality of the clustering broker 220 can be provided at each node 202-205, as depicted by clustering brokers 220, 230, 231, 232. In one embodiment, only one instance of the clustering broker 220, 230-232 will be running at a time, and the cluster-related activity goes through that active resource instance. In one embodiment, the clustering broker functionality is made highly available, and other nodes can become the node that hosts the running instance of the clustering broker functionality. In one embodiment, this is accomplished at least in part by installing the clustering broker 220 as a "resource type" of the cluster, wherein a resource type generally refers to a component that provides functionality to the cluster.

The clustering broker provides functionality including any one or more of VM creation, VM placement, and VM tracking, as well as other functionality on behalf of the nodes at the recovery site. For example, the clustering broker 220 may operate in connection with functionality such as a virtual machine creation module 222 that assists in the creation of a recovery VM (e.g., VM 206) when a request from a primary node requests it. The VM creation module 222, which in one embodiment includes software executable via the processor 210 or other controller(s), assists in creating high-availability virtual machines. For example, when a primary node sets up a replication relationship with a recovery node, a virtual machine may be established on the recovery side. The VM creation module 222 can carry out the process to make the new VM highly available, which ultimately makes the VM capable of moving between the nodes 202-205. The VM creation module 222 may be implemented, for example, within the operating system 218 or hypervisor 216, or as part of the clustering broker 222.

Another function of the clustering broker 220 is the VM placement module 224, which can select a node in which a virtual machine will be placed, and return the recovery node/server name in which the VM was placed back to the requesting primary node. Load balancing may also be utilized by the VM placement module 224, whereby VM placement decisions involve distributing or balancing the workload among the nodes 202-205. A VM tracking module 226 facilitates identification of a recovery node that is currently hosting a targeted VM, after that VM has migrated from a recovery node that was previously known to the sending primary node. These modules 224, 226 may also include software that is executable by the processor 210 or other controller(s).

In one embodiment, centralized management is provided, and configuration settings may be propagated to each of the nodes 202-205 by way of entry of the settings at one node. A management module 228 is provided to facilitate central management, which too may be a software module executable by the processor 210 or other controller(s). In one embodiment, the management module 228 is unified with failover clustering management. Recovery servers can be configured to accept replication via the management module 228 may be available at a central location of the clustering broker, or with any of the nodes 202-205.

In one embodiment, setting the configuration on the clustering broker can set the same configuration on all of the nodes 202-205 using, for example, a cluster database which is a functionality that may be provided by the cluster. For example, a graphical user interface (GUI) may be provided that enables configuration of a recovery server, which can be propagated to other recovery nodes. The GUI may enable entry of information such as whether to enable a particular node to be used as a recovery server, whether to authenticate incoming replication requests, and if so, what authentication type to use, what port numbers to use for incoming replication requests, whether replication requests can be obtained from any (primary) server, or only from those servers associated with a list, etc. It should be noted that the recovery site 201 may include servers or other computing devices having analogous processing, memory, storage, virtual machine and virtual machine management capabilities as described in FIG. 2.

Figure 3A:
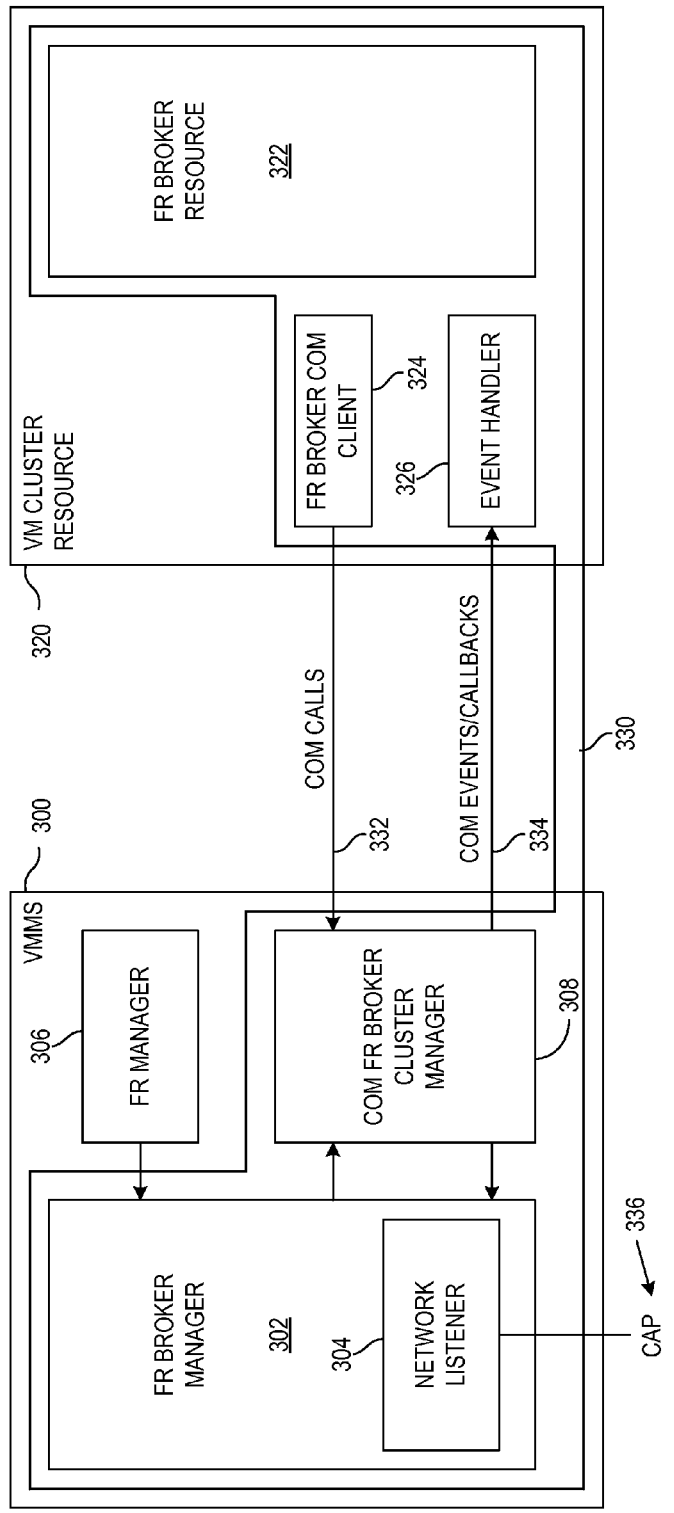
FIG. 3A is a block diagram illustrating a representative architecture diagram of modules associated with the clustering broker feature.

FIG. 3A is a block diagram illustrating a representative architecture diagram of modules associated with the clustering broker feature. In one embodiment, the clustering broker functionality is provided in each of the nodes, and may include various modules. In the example of FIG. 3A, the clustering broker feature includes at least a failover replication (FR) broker manager 302, FR network listener 304, COM FR broker cluster manager 308, FR broker resource 322, FR broker COM client 324 and event handler 326. Collectively, these features will be referred to in connection with the description of FIG. 3A as the replica clustering broker, or RCB 330.

In one embodiment, such as the embodiment illustrated in FIG. 3A, some clustering broker functionality is placed in a management module(s). One representative example of such a management module is, for example, the virtual machine management service (VMMS) provided as part of HYPER-V™ by MICROSOFT® Corporation. The VMMS 300 (or other management module) generally represents a management service that serves as a point of interaction for incoming management requests. Some of the clustering broker functionality is also placed in the VM cluster resource 320, which is a cluster resource DLL. However, while the description of FIG. 3A is described in terms of a VMMS 300 and a VM cluster resource 320, it should be recognized that the principles described herein are equally applicable to any other analogous functionality for managing or interacting with virtual machines. Thus, the functionality described herein may be disassociated with any VMMS 300 or VM cluster resource 320.

The representative replica clustering broker (RCB) 330 runs on the recovery cluster, and serves as a single point of contact in the recovery cluster for the virtual machines being replicated. Among other things, the RCB 330 provides a recovery server name for initial VM placements, and provides the VM to recovery server mapping. The representative RCB 330 includes the VM cluster resource 320 that can create the cluster service. A "resource" generally represents a unit of functionality that can be managed in a cluster, and can migrate as well. Thus, a resource in this regard can be considered high availability (HA). As machines can go down based on various activities (e.g., load balancing or other cluster initiated activity), the RCB 330 is made highly available (HA) on the recovery cluster. In one embodiment, the interactions with the clustering occur in the VM cluster resource 320 DLL.

In one embodiment, the communication between the VMMS 300 and the VM cluster resource 320 occurs using component object model (COM) calls 332 and COM events 334. In one embodiment, COM calls 332 are used for calling into the VMMS 300 (or other management entity) from the VM cluster resource 320, and COM events are used for calling into the VM cluster resource 320 from the VMMS 300. The various modules associated with the representative RCB 330 are now described.

The FR broker resource 322 is a new resource type added into a VM cluster resource DLL 320, which makes the FR broker resource 322 highly available. In one embodiment, the recovery cluster has one instance of the FR broker resource 322 running, and all of the cluster-related activity comes to that base resource instance. When an instance of this resource type is created, a network resource is also created, which has a client access point (CAP) in the cluster. Generally, a CAP is another resource type of the cluster that represents a combination of a network name and associated IP address resource. Thus, when the FR broker resource 322 instance is created, the CAP will expose a network name, and one or more addresses such as an IPv4 and/or IPv6 address. The CAP does not contain the fully-qualified domain name (FQDN), so in one embodiment the domain name service (DNS) name is extracted from the node and appended to the CAP name. Other manners of obtaining the FQDN may similarly be used. It should be recognized that while "FQDN" is used an example herein, other representations of complete domain names may also be used. In any event, this full name may be used as the network name for the recovery cluster (e.g., cluster 122 of FIG. 1 or cluster 200 of FIG. 2), and the primary servers use this name to connect to the recovery cluster. The CAP, FQDN or other unique address of the recovery cluster is different from any of the recovery server names in the cluster. When the FR broker resource 322 instance becomes active/online, it triggers FR broker manager 302 to start the FR network listener 304, which is described more fully below. Incidentally, when FR broker resource 322 goes offline, the FR network listener 304 will be stopped.

Other RCB 330 modules associated with the VM cluster resource 320 are the FR broker COM client 324 and the event handler 326. These modules communicate with the COM FR broker cluster manager 308 at the VMMS 300. In one embodiment, the COM FR broker cluster manager 308 is a private COM server used for communicating between the VM cluster resource 320 and VMMS. An interface object of COM FR broker cluster manager 308, shown as the FR broker COM client 324, is created in the VM cluster resource 320 and used to communicate with VMMS 300. An event sink or handler 326 is also implemented to receive incoming events provided in the COM FR broker cluster manager 308. When VMMS 300 wants to call into the VM cluster resource 320, it uses these events.

In one embodiment, the FR broker manager 302 is a singleton object that is activated from the VMMS's 300 service module (not shown). In one embodiment, the FR broker manager 302 maintains the FR network listener 304 and a reference to the COM FR broker cluster manager 308 in case VMMS 300 is running in a clustered environment. The FR broker manager 302 is configured to receive messages from the primary site through the FR network listener 304, make calls into the VM cluster resource 320 using the COM FR broker cluster manager 308, and reply back to the primary site.

In one embodiment, the FR manager 306 places the virtual machines into nodes, and calls into the FR broker manager 302 to initiate making the virtual machines highly available by having them placed on the cluster. The FR broker manager 302 can internally call the FR broker resource 322 to make the particular VM highly available. For example, a VM that is made highly available will have its files (e.g., VHD, AVHD and/or other files related to the VM) stored in clustered storage.

When nodes at the primary site want to communicate with nodes at the recovery site, messages from the primary site will arrive at the VMMS 300. When the FR network listener 304 has been started in response to the FR broker resource 322 instance becoming active, the FR network listener 304 receives those requests, passes them on to the FR broker manager 302 to ultimately be communicated to the FR broker resource 322 to obtain the information associated with the request. Thus, the FR network listener 304 is used to handle the request from nodes at the primary site.

In one embodiment, the network listener can use the same ports as failover recovery, but uses a different network name, which is the RCB 330 CAP 336 or other FQDN. This CAP 336 has a unique IP address associated with it, which the FR network listener 304 monitors for. The FR network listener 304, which may be a hypertext transfer protocol (HTTP) network listener referred to herein as FrnHttpServer, may work in stand-alone replication and be re-used in the cluster replication described herein. For example, the FR network listener 304 FrnHttpServer assumes that it is hosting the local server, and takes the local machine name as part of its uniform resource identifier (URI). The RCB 330 has a different CAP, and the URI will be different. In one embodiment, both the recovery server and the RCB 330 can listen using /frvroot. For example, multiple listeners may be listening on one port, and a URI such as the example frvroot may be used to identify the listener who should pick up the calls. Thus, for purposes of this example, frvroot is merely an example of a name of the listener to which the sending device wishes to send a request or otherwise call. The URI formed will be different because the hostname is different between the two. For example, for a recovery server r1.contoso.com, the recovery server URI may be http://r1.contoso.com:80/frvroot. For RCB 330 running on the same server with CAP name "brkr," the URI would be http://brkr.contoso.com:80/frvroot.

Figure 3B:
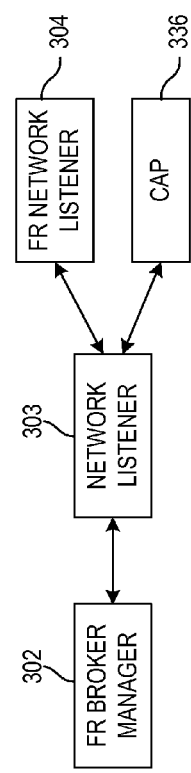
FIG. 3B depicts an exemplary network listener functionality that may be used in connection with the clustering broker feature.

When a server is enabled as a recovery server, a network listener may be brought up. In one embodiment, this occurs independent of whether the particular server is a stand-alone server or a clustered server. Thus, in a clustered environment made up of X nodes, one embodiment involves providing an FR network listener 304 on each of the nodes, plus one broker listener for the cluster. FIG. 3B provides an alternative depiction of network listener functionality in the RCB 330 in accordance with one embodiment. More particularly, as previously noted, when an instance of a FR broker resource 322 is created, a network resource is also created in one embodiment, which has a CAP 336 in the cluster. This refers to the broker listener, or the listener that serves as the listener for the cluster. Thus, network listener functionality 303 communicatively coupled to the FR broker manager 302 may include the CAP 336 provided on behalf of the cluster, and the FR listener 304 that is provided on each of the nodes of the cluster. As noted above, the FR network listener 304 may take the local machine name as part of its URI, where the RCB 330 has a different CAP so its URI will be different. The URIs formed will be different because the hostname is different between the two, as noted above. Thus, in one embodiment, there are two entities running on the same port with different URIs.

Figure 4:
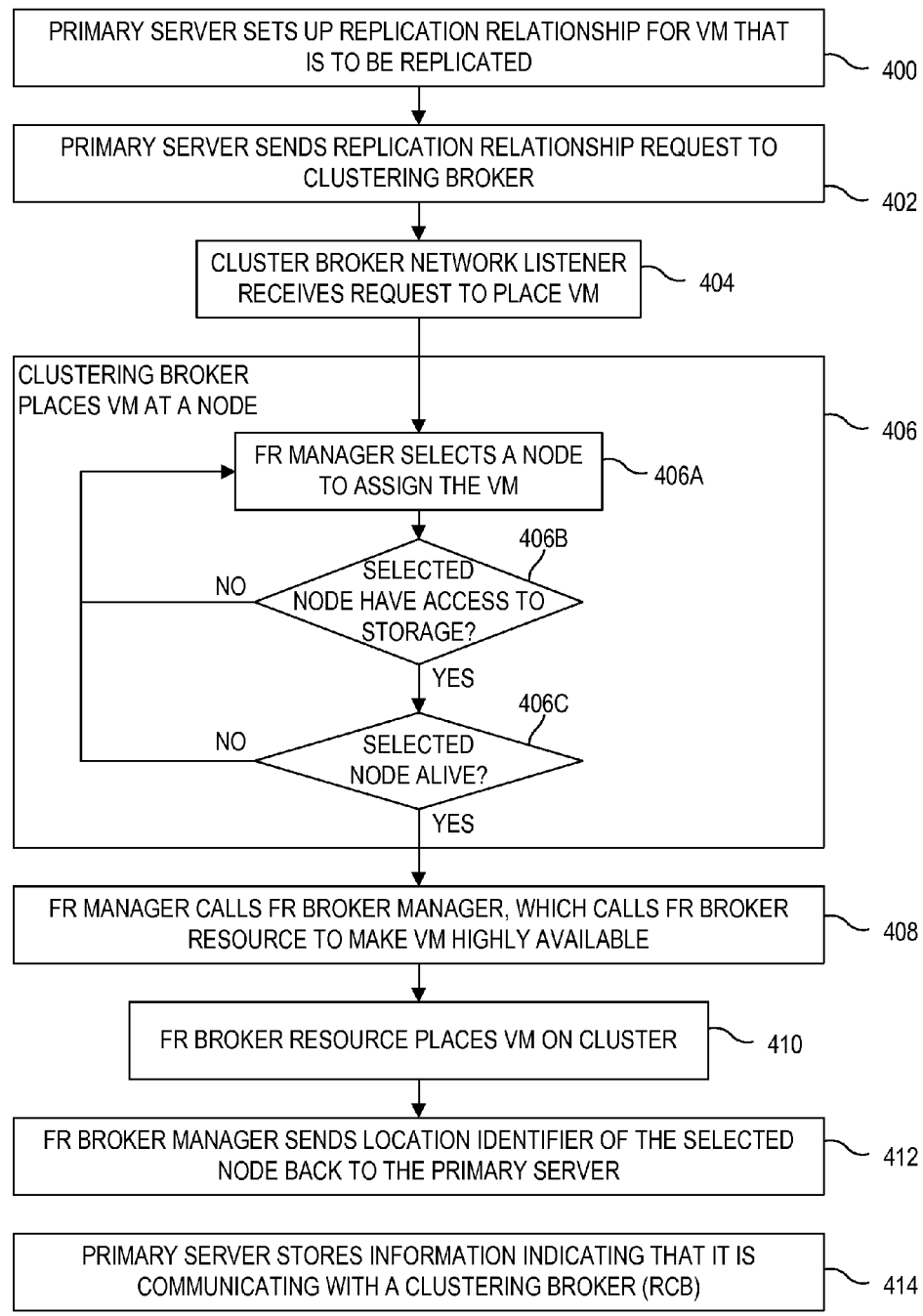
FIG. 4 is a flow diagram depicting a representative manner in which the replica clustering broker may be utilized.

FIG. 4 is a flow diagram depicting a representative manner in which the RCB 330 may be utilized. Reference is also made to FIG. 3A in this example. The example of FIG. 4 assumes that a VM is to be placed at a recovery site. The primary server sets up the replication relationship for a VM that is to be replicated as shown at block 400. In one embodiment, the replication relationship is set up by providing the CAP 336 associated with the RCB 330 as the "recovery server." As block 402 shows, the primary server sends the relationship request to the clustering broker, or RCB 330 in this example. The request to place the VM at a node will be received at the FR network listener 304, as shown at block 404. Block 406 shows that the RCB 330 can place the VM at a node. In one embodiment, this is accomplished by the FR manager 306 or other entity selecting a recovery node to assign to the VM, as shown at block 406A. It may be determined at block 406B whether the selected recovery node has access to the storage at the given time. For instance, in the case of a cluster disk resource, the only node that would have read/write access to the disk would be the owner. Therefore, for a disk resource, the initial node selected would be the owner. Similarly, for other storage resource types, the RCB 330 would obtain the list of nodes that have access to the storage and, in one embodiment, select randomly from that list. If the selected node does not have access to storage as determined at block 406B, another node can be selected at block 406A. The RCB 330 also checks with a clustering service to determine whether the selected node is "alive," and if not, another node can be selected at block 406A. Otherwise, when it finds a node that is alive as determined at block 406C, the VM can be placed at that node as block 406 shows. At least the node on which the RCB 330 itself is running will be "alive." It should be recognized that the depicted operations of blocks 406B and 406C need not be provided at all. Alternatively either or both operations 406B/406C may be provided.

As shown at block 408, the FR manager 306 can call the FR broker manager 302, who in turn calls the FR broker resource 322 requesting that the VM be made highly available. In one embodiment, the FR broker manager 302 calls the FR broker resource 322 by way of a COM event(s) 334 from the COM FR broker cluster manager 308 to the FR broker COM client 324. Block 410 shows that the FR broker resource 322 can then place the VM on the cluster, thereby making it highly available (HA). The FR broker resource 322 can itself place the VM on the cluster, or in other embodiments it may direct one or more other modules to place the VM on the cluster. The FR broker manager 302 sends the FQDN or other location identifier of the selected and highly-available recovery node back to the primary server, as shown at block 412. Since the primary server obtained an FQDN or other unique identifier in response, the primary server will know that it is communicating with an RCB 330, and will store information, set a flag, or otherwise remember that information as shown at block 414.

It should be recognized that the functions shown in FIG. 4 are representative of one embodiment, as the broker functionality may involve checking of additional pre-requisites in some embodiments. For example, in one embodiment, the clustering broker can be extensible wherein it can provide for other modules to plug in rules that are run before placing a VM on a node. This may be utilized by management software to do additional logic while placing a VM, and achieve better resource management.

In addition to placing nodes, the RCB 330 can assist in load balancing by placing VMs in a manner that distributes the VM workload over the nodes of the cluster. By making VMs high availability on the recovery side, the VMs can be moved around easily to achieve load balancing (or for other purposes such as node maintenance). The placement of HA nodes are, in one embodiment, influenced by load balancing criteria. Various manners of effecting load balancing can be employed, such as a round-robin approach. In this approach, nodes are assigned to virtual machines in a round-robin fashion. The last node assigned may be persisted across moves of the RCB 330 itself. Another representative manner of effecting load balancing is to randomly select nodes, such as by assigning nodes using a random number generation algorithm. Yet another manner involves using a clustering application programming interface (API) that provides for load balancing. Any of these, or other, manners of providing load balancing may be implemented in connection with the placement of high-availability nodes on the cluster.

Figure 5:
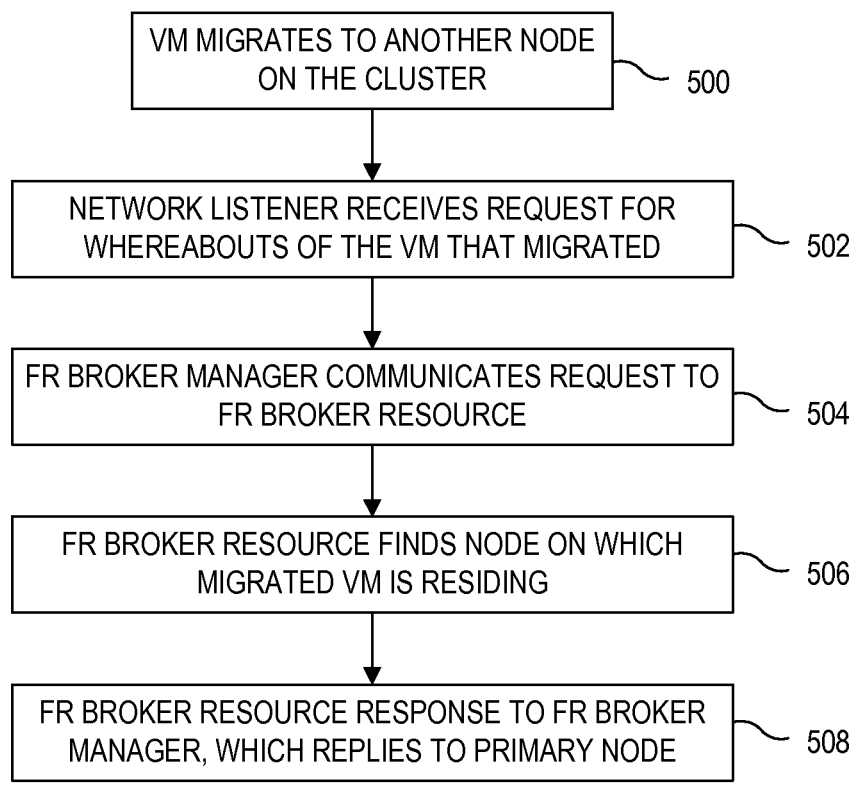
FIGS. 5 and 6 are flow diagrams depicting alternative embodiments for tracking virtual machine migration.
Figure 6:
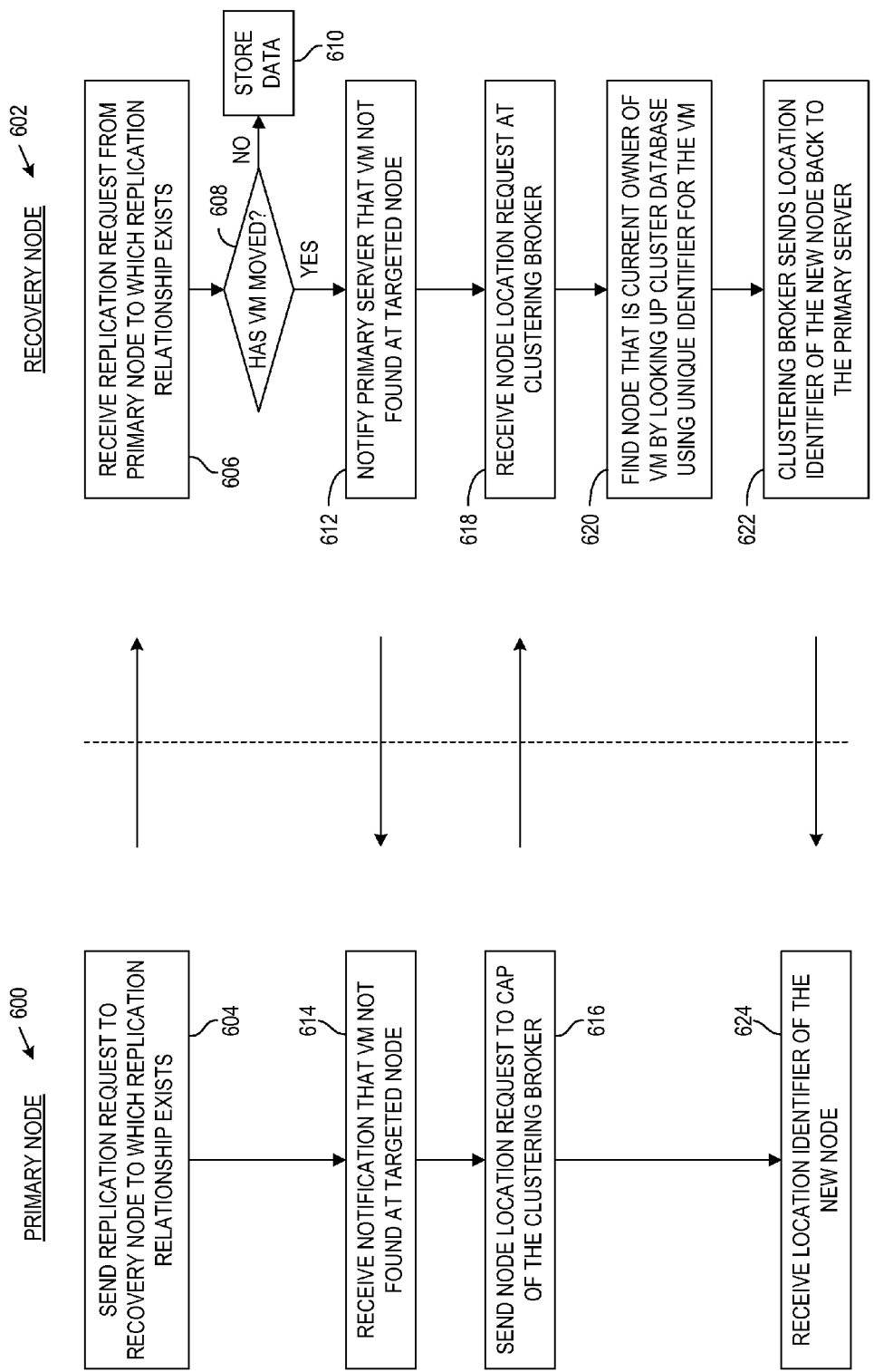

FIGS. 5 and 6 are flow diagrams depicting alternative embodiments for tracking VM migration. Reference is also made to FIG. 3A in the example set forth in FIG. 5, which involves determining where a VM resides on the cluster. Assume a primary node at the primary site has been sending VM deltas or other updates (e.g., differencing disks) to a VM at a recovery node. While that VM may have been originally placed such that the primary node knew which node the VM was residing, the VM can migrate onto any of the nodes in the recovery cluster as shown at block 500, due to its high availability for being part of the cluster infrastructure. The primary node can send a request to the VMMS 300, received by the FR network listener 304, asking for the whereabouts of this particular VM as shown at block 502. Block 504 illustrates that the FR broker manager 302 then communicates with the FR broker resource 322, which in turn goes to the clustering infrastructure and finds the node on which it is currently residing as block 506 demonstrates. With this information, the FR broker resource responds to the FR broker manager 302, which replies back to the primary node with the node on which the particular VM is residing, as shown at block 508.

FIG. 6 is a flow diagram illustrating another representative embodiment of a technique for tracking VM migration. In this example, the primary node 600 sends a replication request to a recovery node 602 to which a replication relationship exists, as shown at block 604. The recovery node 602 receives the replication request from the primary node 600, as shown at block 606. If the VM has not moved as determined at block 608, the data or other information associated with the replication request may be stored as shown at block 610, or other embodiments may not be stored at all. In one embodiment, the recovery node to which the replication request was directed will initiate a notification that the VM is not found, if indeed the VM has migrated to another recovery node. If it is determined at block 608 that the VM had moved, block 612 shows that a notification may be sent to the primary server 600 indicating that the VM was not found at the targeted location. The primary node 600 receives the notification at block 614.

In response to learning that the VM was not at the recovery node to which a replication relationship had previously existed, the primary node 600 sends a node location request to the CAP of the clustering broker, since it remembers that it has communicated with a broker. This embodiment is shown at block 616. The recovery node 602 receives the node location request at the clustering broker (e.g., RCB) as illustrated at block 618. As block 620 shows, the clustering broker finds the node that is the current owner of the VM. In one embodiment, it does this by looking in the cluster database using a unique identifier for the VM, such as a globally unique identifier (GUID), universally unique identifier (UUID) or other unique identifier, and finding the node in the cluster database based on that identifier. Block 622 shows that the clustering broker sends the FQDN or other unique address of the node that currently owns the VM back to the primary server 600, which receives the new location identifier as shown at block 624. As these examples illustrate, these processes can be accomplished without manual administrator efforts.

Figure 7:
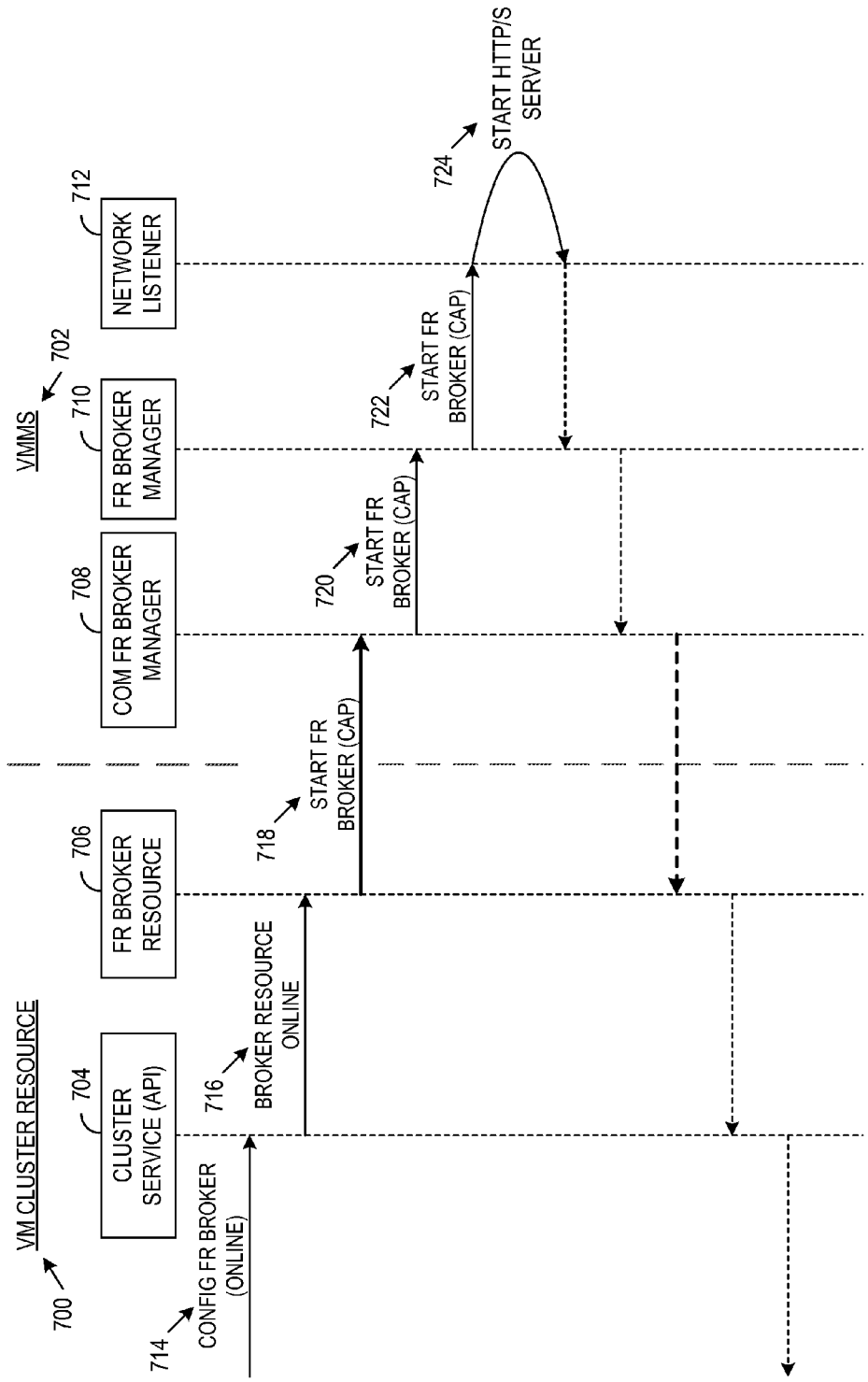
FIG. 7 is a message flow diagram of a representative manner of initiating the replica clustering broker.

FIG. 7 is a message flow diagram of a representative manner of initiating the replica clustering broker. In this embodiment, a VM cluster resource 700 and VMMS 702 are assumed as the associated cluster resource and management service respectively, but the principles described herein are equally applicable where the clustering broker functionality is associated with other similar resources/services or provides those features itself. Further, for purposes of this example, it is noted that the FR broker resource 706, COM FR broker manager 708, FR broker manager 710 and network listener 712 respectively correspond to the modules 322, 308, 302 and 304 of FIG. 3A.

The VM cluster resource 700 includes a cluster service (API) 704 that represents a system component used to control failover cluster activities on a single node. In accordance with the present disclosure, the cluster service 704 receives an indication to configure the FR broker to come online as depicted at message 714. The cluster service 704 calls the online function of the FR broker resource 706 when it is to be initiated, as shown by message 716. The FR broker resource 706 fetches the CAP name from the cluster resource group that it is part of, where the CAP may be configured as part of the clustering broker, and the FR broker resource 706 then calls into the VMMS 702 as shown by message 718. Using the CAP, the call 718 can start the network listener 712. More particularly, the call 718 from the FR broker resource 706 is provided to the FR broker manager 710 via the COM FR broker manager 708 as shown by message 720. In response, the FR broker manager 710 creates the network listener 712 using the given CAP name, as depicted by message 722. The network listener 712, which in one embodiment is a secure HTTP server (e.g. HTTP/S server), is started 724, and a reply can be provided thereafter. In one embodiment, the HTTP server need not be a secure server, although is depicted as a secure server in FIG. 7. In general, FIG. 7 illustrates that the clustering broker startup generally involves creating an instance of a clustering broker resource type, creating a network resource having a CAP (or other analogous address) in the cluster, obtaining a full FQDN is needed, and triggering the start of the network listener in response to the FR broker resource 706 coming online.

FIGS. 8A-8D illustrate representative communication protocols between the primary site and the recovery cluster. The specific protocols described in connection with FIGS. 8A-8D are provided merely for purposes of facilitating an understanding of representative manners in which certain communications could be conducted, but it should be recognized that other manners for providing the same result may be implemented. Like reference numbers are used in FIGS. 8A-8D where appropriate.

Figure 8A:
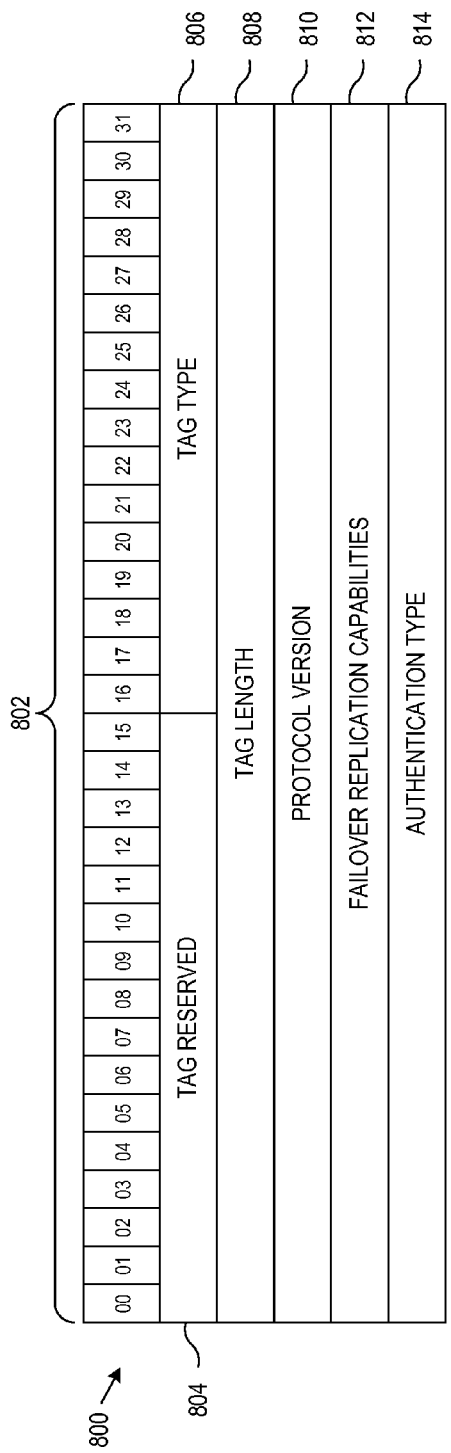
Figure 8B:
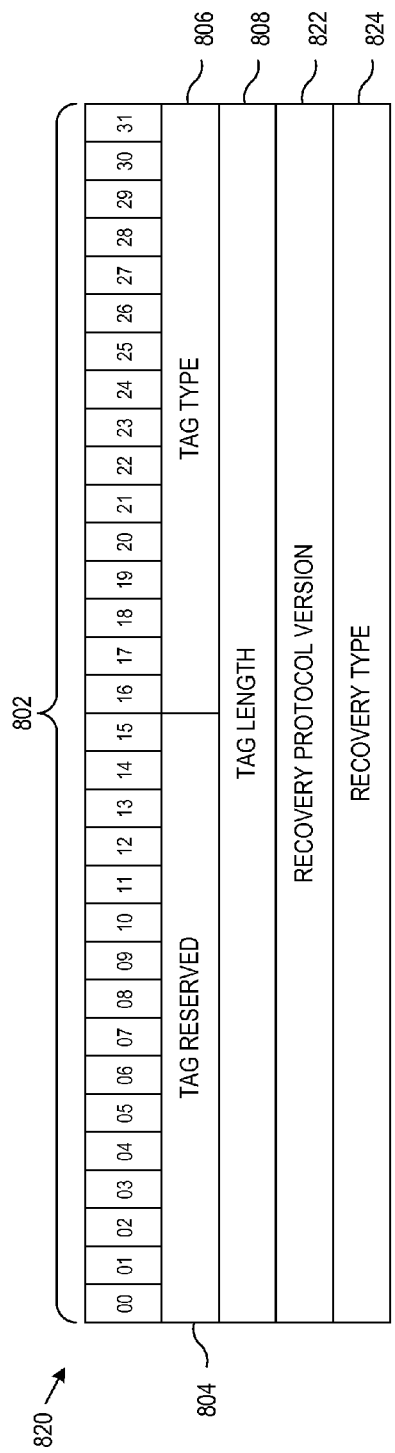

In one embodiment, failover replication does not expose the concept of the recovery cluster to the user on the primary server(s) at the primary site. The representative protocols of FIGS. 8A-8D can work with both the cluster and a stand-alone node on the recovery site with no change expected on the user's part, and these figures illustrate a representative example of connection sequences and packet details. More particularly, FIG. 8A illustrates a representative packet 800 or portion thereof that can be used by the primary server to send a negotiate request packet. The representative packet 800 has a width 802, but any packet structure may be implemented. Packet fields such as tag reserved 804, tag type 806 and tag length 808 may be provided. Fields that include information relating to the clustering broker include the protocol version 810, failover replication capabilities 812 and authentication type 814. The protocol version 810 is provided by the primary server for compatibility issues, and the recovery server can verify the compatibility on its response. Failover capabilities 812 can be used to determine the capabilities for compression types and encryption levels that the primary server and recovery server supports. The authentication type 814 indicates the type of authentication used for this connection. As an example, a first value could indicate integrated authentication using Kerberos, a second value could indicate authentication using secure sockets layer (SSL) certificates, etc.

In response to successfully receiving the primary server's negotiate request packet 800, the recovery server sends a response, such as the negotiate response packet 820. The response includes at least a recovery protocol version 822 that provides an indication of whether the protocol version of the primary server is compatible with the recovery server. The values in this field may be, for example, a verification value in which case the communication can continue, or a protocol mismatch error value in which the communication may be closed.

The recovery type 824 indicates whether the responding recovery server is a clustering broker or a stand-alone recovery server. There may be differences in the communication between a primary site and a recovery site depending on whether the recovery site is operating as a stand-alone recovery server or a recovery cluster. The value provided in this recovery type 824 field indicates whether the responder is a stand-alone recovery server, or a clustering broker as described herein. A first value could indicate a recovery type of stand-alone, a second value could indicate a recovery type of clustering broker, etc. The sending primary server need not know the type of recovery entity that it will be dealing with when sending it's negotiate request packet 800. This information can be provided back to the primary server. If the recovery type 824 is a stand-alone, the primary server can simply communicate to the stand-alone recovery server in a normal process. If the recovery type 824 is a clustering broker, the primary server is made aware of this by way of the negotiate response packet 820, the primary server may thereafter send information that is specific to, or at least aware of, the recovery server being associated with a cluster.

In response to receiving the negotiate response packet 820 with successful status, the primary server looks at the recovery field type 824. If the recovery type 824 is set to indicate a clustering broker, in one embodiment the primary server sends a query recovery server packet 830 to the clustering broker at the recovery site. This packet 830 includes, among other things, the virtual machine identifier (VMID) 832, 834 of the VM that the primary server wants to replicate, or to find the destination recovery server name for that VM. In one embodiment, the VMID value is a GUID and indicates the identifier of the virtual machine for which the clustering broker is queried for the placement of the VM.

In response to the clustering broker receiving the VMID from the VMID field 832, 834, the clustering broker looks up the node where the VM is available or needs to be placed. The clustering broker sends a packet 840 with the recovery server name 842 that is the name of the recovery server node in which the VM will be placed. The recovery port 844 provides the port of the recovery server node in which the connection is to be made. The packet 840 also includes the existing VM field 846 that indicates whether the VM already exists in the recovery cluster. This may be used, for example, to determine the deletion of the VM from the recovery server. For example, if the VM is deleted from the recovery server, the clustering broker may return this as a "0" or other set value, and the primary server can decide to go to a state that would trigger administration intervention or other desired actions.

Figure 9:
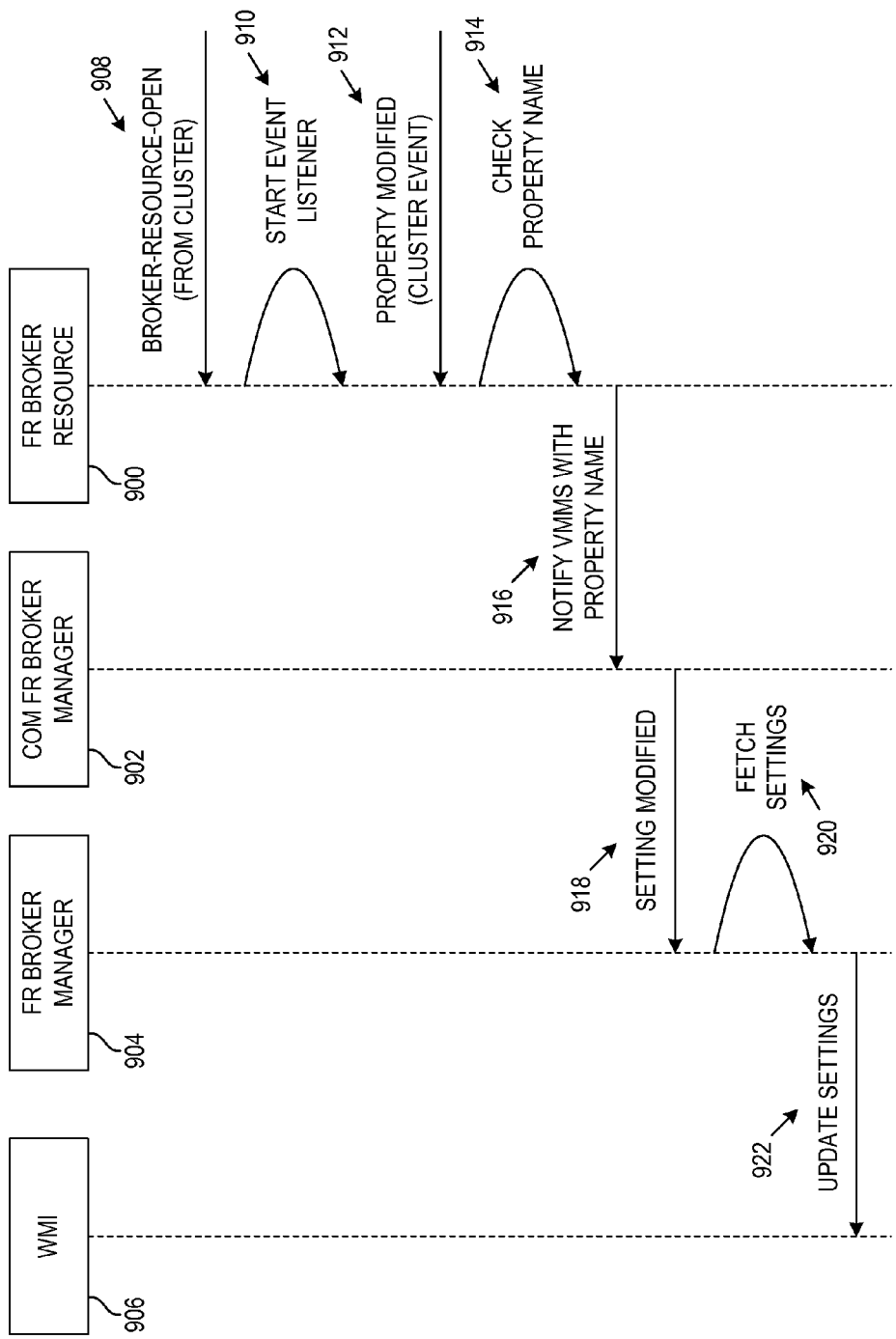
FIG. 9 is a message flow diagram illustrating one embodiment for propagating the settings to the nodes of the recovery cluster.

In one embodiment, when the recovery cluster settings get updated, the changes are propagated to all of the nodes of the recovery cluster. The cluster can provide an event mechanism for providing a notification of the changes to all of the nodes. These events may include the resource state changes, property changes, etc. FIG. 9 is a message flow diagram illustrating one embodiment for propagating the settings to the nodes of the recovery cluster. For purposes of this example, it is noted that the FR broker resource 900, COM FR broker manager 902 and FR broker manager 904 respectively correspond to the modules 322, 308 and 302 of FIG. 3A.

The FR broker resource 900 can receive a message 908 for the FR broker resource to open or go online. When a change to any private property of a resource happens on any cluster node, a notification of the change can be provided to all of the nodes via the cluster events. The FR broker resource 900, on each node, listens 910 to the property change events. The listener will be started at the initialization of the FR broker resource on each node. Upon receiving a property change event as shown by event 912, the FR broker resource may use the values of the properties to update the settings and check the property name 914. The FR broker resource 900 sends the change notification to the FR broker manager 904 using, in one embodiment, a private COM interface between the FR broker resource 900 and the VMMS. In a more particular example shown in FIG. 9, the FR broker resource 900 notifies the VMMS of the property name, which is provided to the FR broker manager 904 via the COM FR broker manager 902 as shown by messages 916 and 918. The FR broker manager 904 can fetch the settings 920. The COM FR broker manager 902 can internally call into the WINDOWS® management instrumentation (WMI) 906 registered callback via FR broker manager 904. In one embodiment, the WMI 906 takes these changes 922 and updates the local registry on a separate thread. While the example of FIG. 9 involves an implementation utilizing WMI, the description is equally applicable to other management infrastructures.

As demonstrated in the foregoing examples, the embodiments described herein facilitate disaster recovery and other replication features for recovery sites that employ failover clustering and/or other high availability techniques. Among other things, high-availability virtual machines can be properly placed on a recovery server by the clustering broker functionality that serves the recovery cluster. Unified management with existing products can be provided, such as with failover clustering products. No administrator intervention is needed to restart a VM replication if the recovery VM migrates from one recovery node to another. In this manner, VMs may be placed across storage types, centralized management can be provided, high-availability recovery/replicated VMs can be created without administrator intervention, replication can be established after a recovery/replicated VM migrates, etc.

Figure 10:
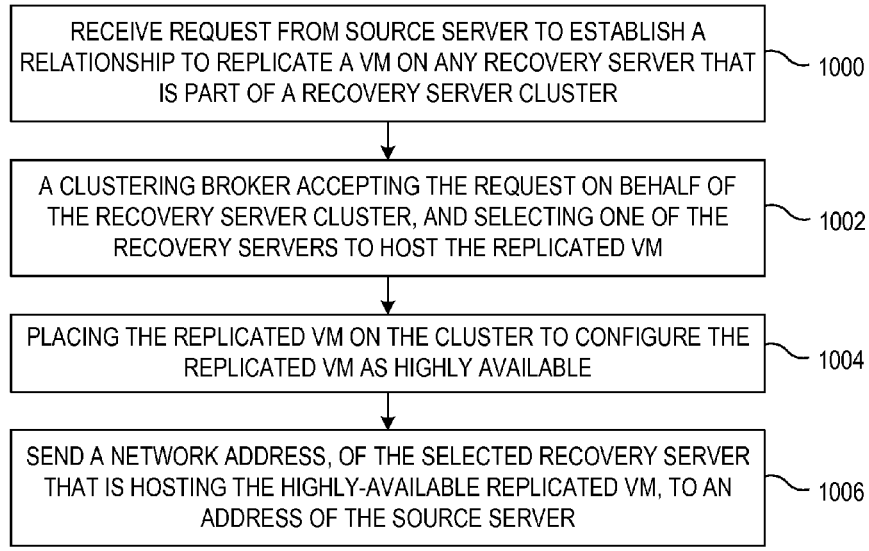
FIG. 10 is a flow diagram of a technique for placing virtual machines at a node according to the disclosure.
Figure 11:
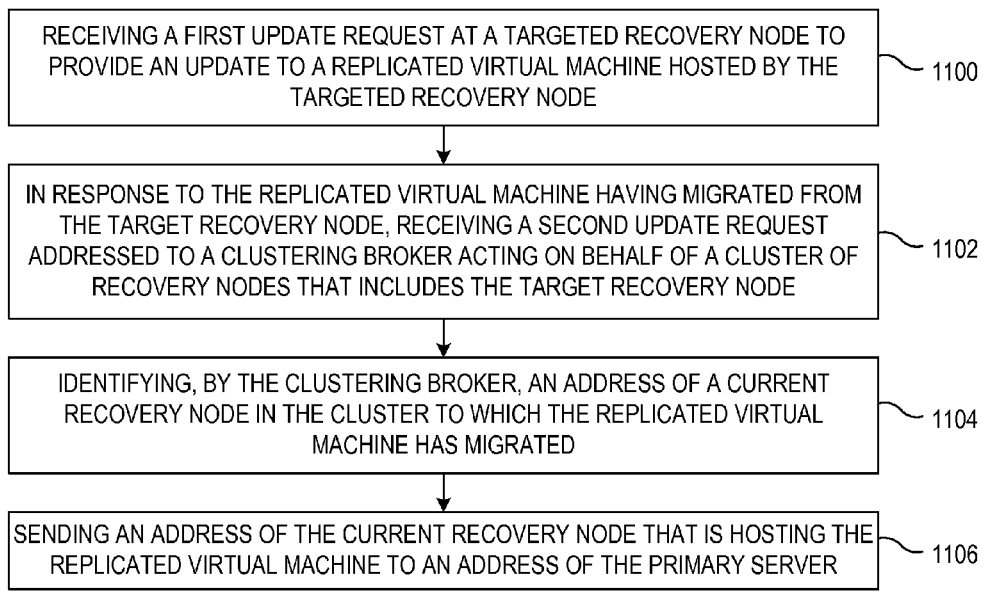
FIG. 11 is a flow diagram of a technique for tracking VM migration according to the disclosure.

FIGS. 10 and 11 illustrate other embodiments of techniques for facilitating replication of virtual machines. In these embodiments, method are described that can be executed on a computing device, such as by providing software modules that are executable via a processor (which includes a physical processor and/or logical processor, controller, etc.). The methods may also be stored on computer-readable media that can be accessed and read by the processor and/or circuitry that prepares the information for processing via the processor. Having instructions stored on a computer-readable media as described herein is distinguishable from having instructions propagated or transmitted, as the propagation transfers the instructions versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained.

FIG. 10 is a flow diagram of a technique for placing virtual machines at a node according to the disclosure. In this embodiment, block 1000 illustrates that a request is received from a source server to establish a relationship to replicate a virtual machine on any recovery server that is part of a cluster of recovery servers. At block 1002, the request is accepted by the clustering broker on behalf of the cluster, and at least one of the recovery servers is selected to host the replicated virtual machine. At block 1004, the replicated virtual machine is placed on the cluster by the clustering broker, which makes the virtual machine highly available (HA). In one embodiment, the clustering broker identifies the recovery server on which the virtual machine should be placed, but does not physically place the virtual machine in the node which may be performed by a placement module. In other embodiments, the functionality of placing the virtual machine in the recovery server may be integrated into the clustering broker. As shown at block 1006, a network address of the selected recovery server that is now hosting the replicated VM is sent to the source server, such as by directing the network address to an address of the source server.

In other embodiments, receiving the request may involve receiving the request at a network listener that is directed to a client access point (CAP) associated with the cluster of recovery servers. In another embodiment, a domain name service (DNS) name for the recovery server hosting the active instance of the clustering broker may be extracted, and appended to the CAP for use as a network name for the cluster. In another embodiment, the clustering broker may implement load balancing across the recovery servers of the cluster when placing the replicated virtual machine on the cluster. Another representative example involves the clustering broker providing a notification directed to the source server that the request has been received by a clustering broker rather than a stand-alone recovery server that is not associated with the cluster, in order to enable the request to be directed to the clustering broker on behalf of the cluster of recovery servers. The clustering broker can be configured as a resource type of the cluster so that the clustering broker itself is highly available.

FIG. 11 is a flow diagram of a technique for tracking VM migration according to the disclosure. In this embodiment, block 1100 illustrates receipt of a first update request at a targeted recovery node to provide an update to a replicated virtual machine that is hosted by the targeted recovery node. The replicated virtual machine corresponds to a primary virtual machine at a primary device. In response to the replicated virtual machine having migrated from the target recovery node, a second update request is received that is addressed to a clustering broker acting on behalf of a cluster of recovery nodes that includes the target recovery node, as block 1102 depicts. At block 1104, the clustering broker identifies an address of a current recovery node in the cluster to which the replicated virtual machine has migrated. An address of the current recovery node that is hosting the replicated virtual machine is sent to the primary server.

In other embodiments, the current recovery node can be identified by receiving a unique identifier of the virtual machine in the second update request, and by using the unique identifier of the virtual machine, locating the current recovery node in a cluster database that provides an association of virtual machine unique identifiers and their current recovery nodes. In another embodiment, receiving a second update request addressed to a clustering broker involves receiving the second update request at a client access point (CAP) of a network listener of the clustering broker instead of at the targeted recovery node. Another embodiment involves receiving a third update request at the current recovery node to provide an update to the replicated virtual machine that migrated to the current recovery node.

Figure 12:
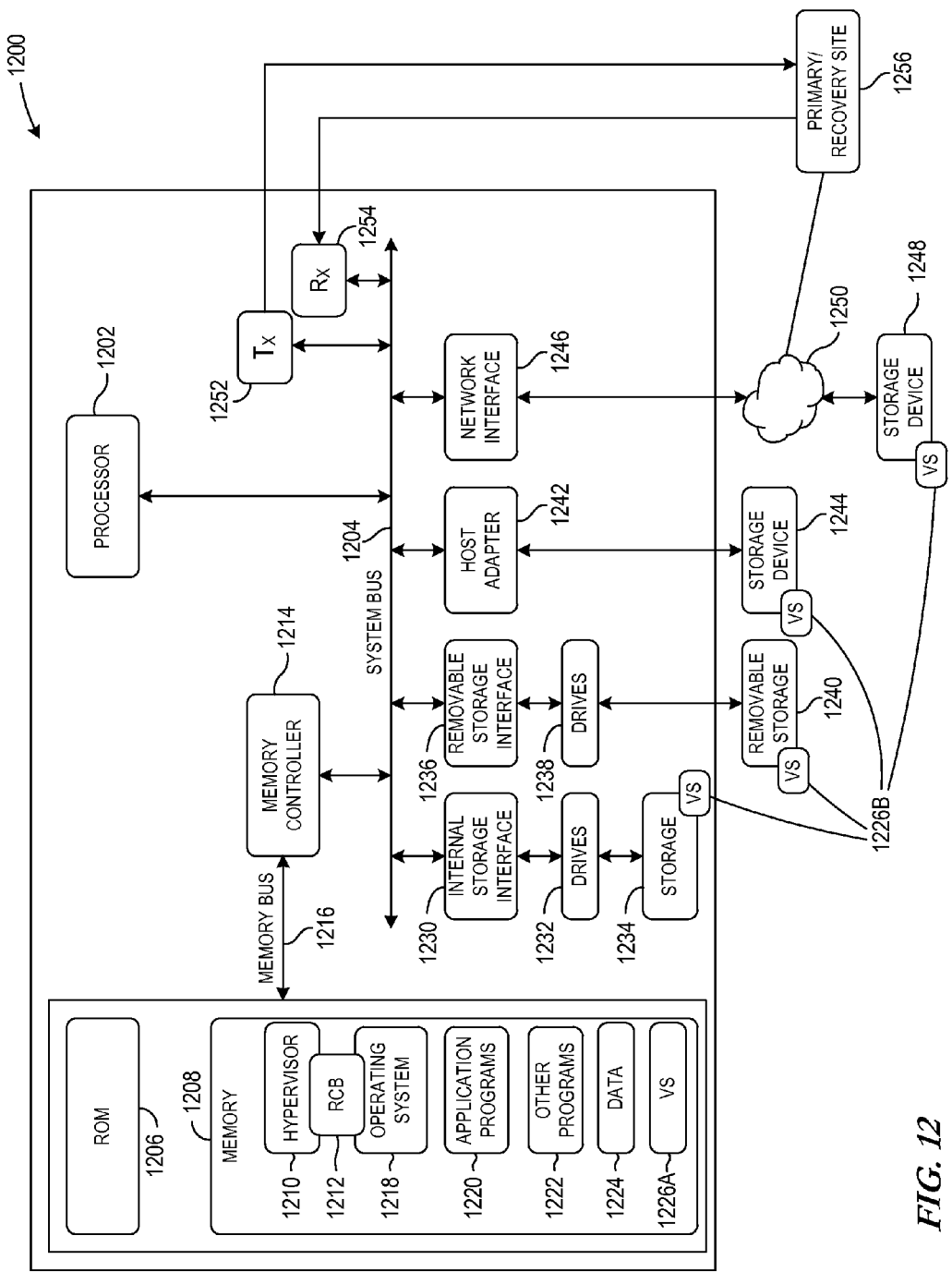
FIG. 12 depicts a representative computing system in which the replication principles may be implemented.

FIG. 12 depicts a representative computing system 1200 in which the principles described herein may be implemented. The computing environment described in connection with FIG. 12 is described for purposes of example, as the structural and operational disclosure for replicating storage or virtual storage is applicable in any computing environment. The computing arrangement of FIG. 12 may, in some embodiments, be distributed across multiple devices. Further, the description of FIG. 12 represents a server or other computing device at a recovery site (e.g., a recovery server), although it may also represent a primary server with the exception of the clustering broker feature 1212.

The representative computing system 1200 includes a processor 1202 coupled to numerous modules via a system bus 1204. The depicted system bus 1204 represents any type of bus structure(s) that may be directly or indirectly coupled to the various components and modules of the computing environment. Among the various components are storage devices, any of which may store the subject to the replication.

A read only memory (ROM) 1206 may be provided to store firmware used by the processor 1202. The ROM 1206 represents any type of read-only memory, such as programmable ROM (PROM), erasable PROM (EPROM), or the like. The host or system bus 1204 may be coupled to a memory controller 1214, which in turn is coupled to the memory 1208 via a memory bus 1216. The exemplary memory 1208 may store, for example, all or portions of a hypervisor 1210 or other virtualization software, an operating system 1218, and a module, such as a replica clustering broker (RCB) 1212 that performs at least those functions described herein. The RCB 1212 may be implemented as part of, for example, the hypervisor 1210 and/or operating system 1218.

The memory may also store application programs 1220 and other programs 1222, and data 1224. Additionally, all or part of the virtual storage 1226 associated with a virtual machine may be stored in the memory 1208. However, due to the potential size of the virtual storage disks or other virtual storage types, one embodiment involves storing virtual storage disks in storage devices versus memory, as depicted by the virtual storage 1226B associated with any one or more of the representative storage devices 1234, 1240, 1244, 1248. The virtual storage 1226A in the memory 1208 may also represent any part of the virtual storage that is temporarily cached or otherwise stored in memory as an intermediate step to being processed, transmitted, or stored in a storage device(s) 1234, 1240, 1244, 1248.

FIG. 12 illustrates various representative storage devices in which data may be stored, and/or virtual storage may be stored. For example, the system bus may be coupled to an internal storage interface 1230, which can be coupled to a drive(s) 1232 such as a hard drive. Storage media 1234 is associated with or otherwise operable with the drives. Examples of such storage include hard disks and other magnetic or optical media, flash memory and other solid-state devices, etc. The internal storage interface 1230 may utilize any type of volatile or non-volatile storage. Data, including virtual hard disks (e.g., VHD files, AVHD files, etc.) and/or other manners of storing virtual machine configurations and data may be stored on such storage media 1234.

Similarly, an interface 1236 for removable media may also be coupled to the bus 1204. Drives 1238 may be coupled to the removable storage interface 1236 to accept and act on removable storage 1240 such as, for example, floppy disks, optical disks, memory cards, flash memory, external hard disks, etc. Virtual storage files and other data may be stored on such removable storage 1240.

In some cases, a host adaptor 1242 may be provided to access external storage 1244. For example, the host adaptor 1242 may interface with external storage devices via small computer system interface (SCSI), Fibre Channel, serial advanced technology attachment (SATA) or eSATA, and/or other analogous interfaces capable of connecting to external storage 1244. By way of a network interface 1246, still other remote storage may be accessible to the computing system 1200. For example, wired and wireless transceivers associated with the network interface 1246 enable communications with storage devices 1248 through one or more networks 1250. Storage devices 1248 may represent discrete storage devices, or storage associated with another computing system, server, etc. Communications with remote storage devices and systems may be accomplished via wired local area networks (LANs), wireless LANs, and/or larger networks including global area networks (GANs) such as the Internet. Virtual storage files and other data may be stored on such external storage devices 1244, 1248.

As described herein, the primary and recovery servers communicate information, such as negotiating and responding to requests, providing virtual machine base storage, differencing disks, snapshots, etc. Communications between the servers can be effected by direct wiring, peer-to-peer networks, local infrastructure-based networks (e.g., wired and/or wireless local area networks), off-site networks such as metropolitan area networks and other wide area networks, global area networks, etc. A transmitter 1252 and receiver 1254 are depicted in FIG. 12 to depict the computing device's structural ability to transmit and/or receive data in any of these or other communication methodologies. The transmitter 1252 and/or receiver 1254 devices may be stand-alone components, may be integrated as a transceiver(s), may be integrated into or already-existing part of other communication devices such as the network interface 1246, etc. Where the computing system 1200 represents a server or other computing device at the primary site, all or part of the virtual disk or other stored data to be replicated may be transmitted via the transmitter 1252, whether it is a stand-alone device, integrated with a receiver 1254, integral to the network interface 1246, etc. Analogously, where the computing system 1200 represents a server or other computing device at the recovery site, all or part of the virtual disk or other stored data to be replicated may be received via the receiver 1254, whether it is a stand-alone device, integrated with a transmitter 1252, integral to the network interface 1246, etc. Communication between primary and recovery servers will utilize both their transmitters 1252 and receivers 1254. As computing system 1200 can represent a server(s) at either the primary or recovery site, block 1256 represents the primary or recovery server(s) that is communicating with the computing system 1200 that represents the other of the primary or recovery server(s).

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A computer-implemented method, comprising:
   receiving a request from a source server to replicate a virtual machine hosted by the source server to create a replicated virtual machine, the request received at a network listener that is directed to a client access point (CAP) associated with a cluster of recovery servers;
   responsive to receiving the request, selecting a recovery server, from the cluster of recovery servers to host the replicated virtual machine;
   sending a network address, of the recovery server hosting the replicated virtual machine, to an address of the source server hosting the virtual machine, the network address different than the address; and
   extracting a domain name service (DNS) name for at least one recovery server of the cluster of recovery servers, and appending the DNS name to a CAP name of the CAP for use as a network name for the cluster of recovery servers.

2. The computer-implemented method of claim 1, comprising extracting the DNS name and appending the DNS name to the CAP name responsive to determining that the CAP name does not comprise a fully-qualified domain name (FQDN).

3. The computer-implemented method of claim 1, the at least one recovery server hosting an active instance of the clustering broker.

4. The computer-implemented method of claim 1, comprising implementing load balancing across the cluster of recovery servers when placing the replicated virtual machine on the recovery server.

5. The computer-implemented method of claim 1, comprising providing a notification directed to the source server that the request has been received by a clustering broker rather than a stand-alone recovery server that is not associated with the cluster of recovery servers.

6. The computer-implemented method of claim 5, comprising receiving the request from the source server via a common port used for both a first listening module of the clustering broker and a second listening module of the stand-alone recovery server.

7. The computer-implemented method of claim 1, comprising configuring a clustering broker as a resource type of the cluster of recovery servers to provide high availability.

8. The computer-implemented method of claim 1, sending the network address comprising sending the network address by a clustering broker different than the source server.

9. A computer-readable device comprising instructions that when executed perform a method, comprising:
   receiving an update request addressed to a clustering broker acting on behalf of a cluster of recovery nodes comprising a targeted recovery node from which a replicated virtual machine has been migrated, the cluster of recovery nodes associated with a client access point (CAP);
   identifying, a current recovery node, in the cluster of recovery nodes which the replicated virtual machine has been migrated;
   sending a network address of the current recovery node to which the replicated virtual machine has been migrated to an address of a primary server comprising a primary virtual machine corresponding to the replicated virtual machine, the network address different than the address; and
   extracting a domain name service (DNS) name for at least one recovery node of the cluster of recovery nodes, and appending the DNS name to a CAP name of the CAP for use as a network name for the cluster of recovery nodes.

10. The computer-implemented method of claim 9, identifying the current recovery node comprises:
    receiving a unique identifier of the primary virtual machine in the update request; and
    using the unique identifier of the primary virtual machine, locating the current recovery node in a cluster database that provides an association of virtual machine unique identifiers and current recovery nodes.

11. The computer-implemented method of claim 9, the method comprising extracting the DNS name and appending the DNS name to the CAP name responsive to determining that the CAP name does not comprise a fully-qualified domain name (FQDN).

12. The computer-implemented method of claim 9, the method comprising receiving a second update request at the current recovery node to provide an update to the replicated virtual machine that has been migrated to the current recovery node.

13. A system, comprising:
    one or more processors; and
    memory comprising instructions that when executed by at least one of the one or more processors implement:
      a receiver configured to receive a replication request to replicate a source virtual machine;
      a clustering broker configured to identify a recovery node of a cluster of recovery nodes upon which to place a replicated virtual machine that corresponds to the source virtual machine, the cluster of recovery nodes associated with a client access point (CAP);
      a transmitter configured to respond to the replication request via an address associated with the source virtual machine with a network address of the recovery node upon which the replicated virtual machine is placed, the network address different than the address; and
      a component configured to extract a domain name service (DNS) name for at lest one recovery node of the cluster of recovery nodes, and append the DNS name to a CAP name of the CAP for use as a network name for the cluster of recovery nodes.

14. The system of claim 13, the clustering broker comprising a broker resource configured as a resource type of the cluster of recovery nodes to provide high availability.

15. The system of claim 13, the clustering broker comprising a network listener communicatively coupled to the receiver to monitor for one or more replication requests directed to the clustering broker.

16. The system of claim 13, the clustering broker distributed among a virtual machine management service and a virtual machine cluster resource.

17. The system of claim 16, the instructions when executed implementing a private component object model (COM) interface configured to facilitate communications between the virtual machine management service and the virtual machine cluster resource.

18. The system of claim 13, the recovery nodes of the cluster comprising an instance of the clustering broker.

19. The system of claim 13, further comprising a executed implementing a centralized management, having a user interface to change configuration settings regarding one or more of the recovery nodes of the cluster.

20. The system of claim 13, the clustering broker configured to facilitate one or more modules providing rules that are run prior to the replicated virtual machine being placed on the recovery node.

* * * * *